(12) United States Patent
Kumar et al.

(10) Patent No.: US 10,902,339 B2
(45) Date of Patent: Jan. 26, 2021

(54) SYSTEM AND METHOD PROVIDING AUTOMATIC COMPLETION OF TASK STRUCTURES IN A PROJECT PLAN

(71) Applicant: ORACLE INTERNATIONAL CORPORATION, Redwood Shores, CA (US)

(72) Inventors: Manish Kumar, Bangalore (IN);
Raghavan Srinivasan, Bangalore (IN);
Vaibhav Katkar, Karnataka (IN);
Shankare Gowda, Bangalore (IN)

(73) Assignee: Oracle International Corporation, Redwood Shores (CA)

( * ) Notice: Subject to any disclaimer, the term of this patent is extended or adjusted under 35 U.S.C. 154(b) by 1005 days.

(21) Appl. No.: 14/721,114

(22) Filed: May 26, 2015

(65) Prior Publication Data
US 2016/0350673 A1    Dec. 1, 2016

(51) Int. Cl.
*G06N 20/00* (2019.01)
*G06Q 10/06* (2012.01)

(52) U.S. Cl.
CPC ....... *G06N 20/00* (2019.01); *G06Q 10/06313* (2013.01)

(58) Field of Classification Search
CPC ... G06N 99/005; G06F 3/0484; G06F 9/4881; G06Q 10/06313
See application file for complete search history.

(56) References Cited

U.S. PATENT DOCUMENTS

| 6,381,610 B1 * | 4/2002 | Gundewar ............ G06Q 10/06 |
| 8,160,911 B2 | 4/2012 | Lau et al. |
| 2008/0282160 A1 * | 11/2008 | Tonnison ................ G06F 9/451 715/704 |
| 2009/0171881 A1 * | 7/2009 | Gilliam ................ G06N 99/005 706/50 |

(Continued)

OTHER PUBLICATIONS

Ellmer et al., "Process Model Reuse to Promote organizational Learning in Software Development", IEEE 1996 Proceedings of 20th Internatinal COMPSAC'96.*

(Continued)

*Primary Examiner* — Robert A Cassity
*Assistant Examiner* — Tsu-Chang Lee
(74) *Attorney, Agent, or Firm* — Kraguljac Law Group, LLC

(57) ABSTRACT

Systems, methods, and other embodiments are disclosed that are configured to automatically complete the generation of task structures in a project plan. In one embodiment, user data is generated by monitoring interactions of a user with a computer user interface when forming a task structure in a project plan. The user data is compared to learned behavior data. The learned behavior data represents reusable patterns derived from information associated with user creation of previous task structures. If, based on the comparison, the user data matches a reusable pattern of the learned behavior data, a prompt is displayed to the user indicating an option to accept or reject automated completion of the task structure. In response to receiving an acceptance from the user, (Continued)

the forming of the task structure is automatically completed in the project plan based on the matching reusable pattern.

20 Claims, 8 Drawing Sheets

(56) References Cited

U.S. PATENT DOCUMENTS

| | | | |
|---|---|---|---|
| 2012/0054604 A1* | 3/2012 | Warncke-Wang | G06F 17/24 715/255 |
| 2012/0069131 A1* | 3/2012 | Abelow | G06Q 10/067 348/14.01 |
| 2013/0226816 A1 | 8/2013 | Chory et al. | |
| 2013/0254698 A1 | 9/2013 | Schelling et al. | |
| 2014/0114863 A1 | 4/2014 | Byrne et al. | |
| 2014/0278662 A1 | 9/2014 | Reed et al. | |
| 2014/0340305 A1* | 11/2014 | Seong | H03M 7/40 345/156 |
| 2015/0127565 A1* | 5/2015 | Chevalier | G06Q 10/00 705/319 |
| 2017/0351986 A1* | 12/2017 | Button | G06Q 10/06311 |

OTHER PUBLICATIONS

"Project Planning Templates Creator", downloaded Jan. 21, 2015 from: http://2-plan.com/free-project-management-software-2-plan-desktop/project-planning-tools-best-free-download.html; pp. 1-3.

CA; "CA Clarity Project Manager", downloaded from: http://www.ca-clarity.com/cms/upload/EN/pdf/CA_Clarity_Functional_Overview.pdf; 2007, pp. 1-40; CA Headquarters, Islandia, NY, USA.

"Project Management Software—Comindware Project", downloaded Jan. 22, 2015 from: http://www.comindware.com/project/; pp. 1-3.

"Merlin Project Templates", The Merlin Handbook, documentation of version 2.9, downloaded Mar. 13, 2013 from: http://www.projectwizards.net/en/merlin/pdf/MerlinHandbook.pdf; pp. 1-117.

* cited by examiner

SYSTEM AND METHOD PROVIDING AUTOMATIC COMPLETION OF TASK STRUCTURES IN A PROJECT PLAN

BACKGROUND

A computer-based project plan may include many activities to be performed (tasks) for a project. There are often situations where organizations are to perform multiple related activities, for example, as part of a project plan. The activities may be related for the overall objective, and resources are often used (or consumed) in performance of the activities.

Today, a project manager may access a computerized template for a previous project or a previous type of project that is similar to a new project that the project manager wants to plan. The project manager uses the template as a starting point such that the project manager does not have to start completely anew. Often, however, a template is not in the exact form that a particular project manager prefers (e.g., some aspects may be different). Therefore, the project manager has to modify the template to match his/her preferences. This can be tedious and time consuming.

If a project manager creates a significantly different project plan, he/she has to remember to save the project plan as a new template so it can be used again later for a similar project by himself/herself or another project manager. In reality, each project manager will create a project plan in a certain manner for a certain kind of industry.

For example, a particular project manager may generate many task structures within a project plan that are very similar to each other. The project manager may use a copy/paste operation, for example, to generate a new task structure that is similar to a previous task structure within the project plan over a new time period. The project manager may then make minor modifications to the new task structure, if desired. However, this can be tedious and time consuming, especially if repeated many times.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for providing the automatic completion of task structures in a project plan. Example embodiments are discussed herein with respect to a computerized system that implements a project planning tool for use by project planners.

In one embodiment, a project planning tool is disclosed that is configured to monitor interactions of a user with a computer user interface (e.g., a graphical user interface) when forming task structures in a project plan. When starting to manually form a new task structure, the project planning tool compares user data, resulting from associated monitored interactions, to learned behavior data. The learned behavior data represents reusable patterns derived from information associated with user task structure creation in at least one project plan. If the user data matches a part of the learned behavior data, the project planning tool can automatically complete the forming of the new task structure (e.g., given approval from the user) based on a reusable pattern in the learned behavior data. The present systems and methods improve a computer system to allow a project planner to more efficiently create a computerized or electronic project plan.

The following terms are used herein with respect to various embodiments.

The term "task structure", as used herein, refers to a plurality of tasks in a computerized project plan that defines a block of work. The tasks may be related to each other in time and may be associated with various resources needed to complete the tasks.

The term "reusable pattern", as used herein, refers to data derived from a sequence of user interactions, with at least one computer user interface, that has been learned and recorded by a computerized project planning tool based on repeated use of the sequence of user interactions in task structure creation.

The term "learned behavior data", as used herein, refers to a collection of one or more reusable patterns.

Figure 1:
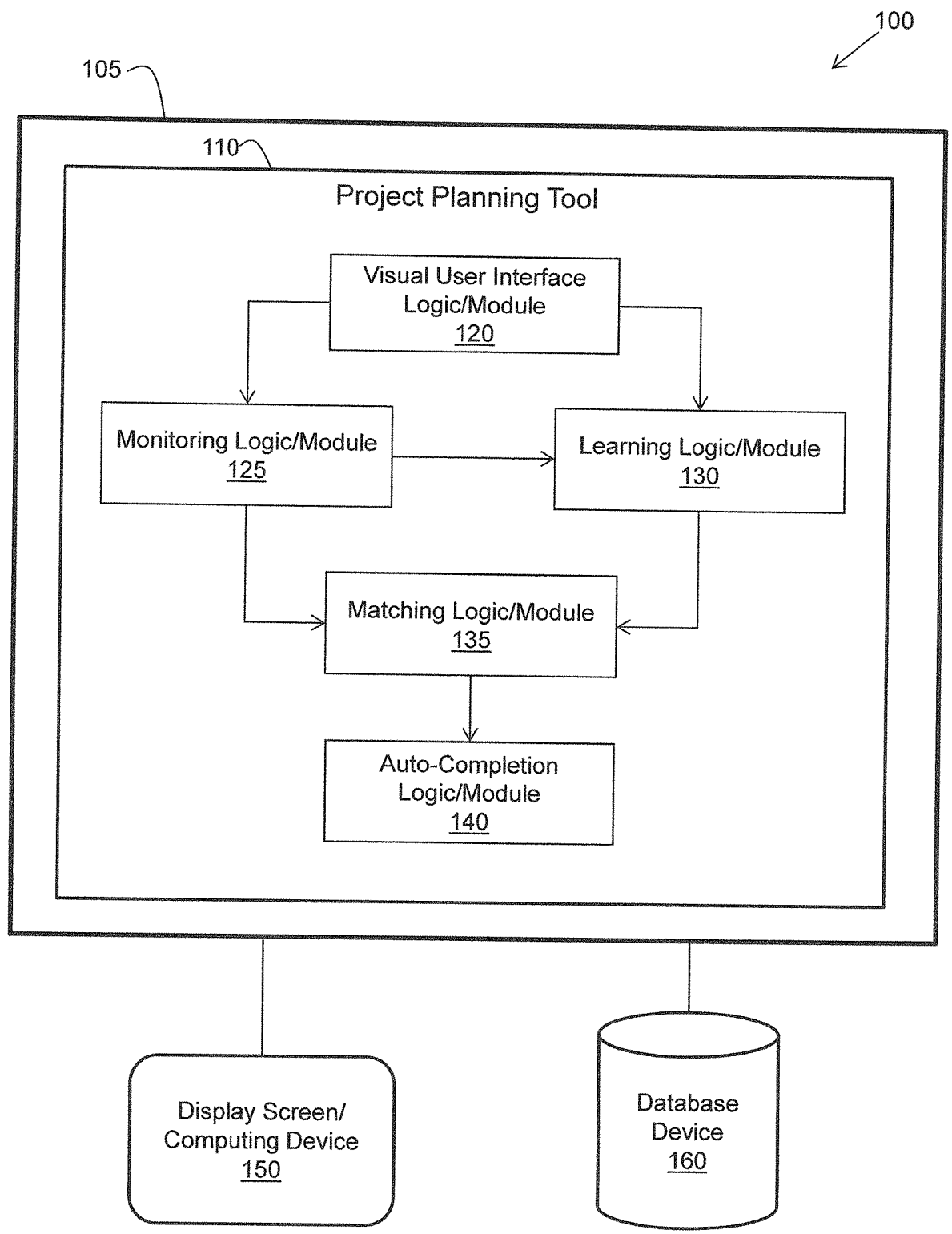
FIG. 1 illustrates one embodiment of a computer system, having a computing device configured with a project planning tool.

FIG. 1 illustrates one embodiment of a computer system 100, having a computing device 105 configured with a project planning tool 110. For example, in one embodiment, the project planning tool 110 may be part of a larger computer application configured to plan and manage a project. The project planning tool 110 is configured to computerize the process of planning a project having multiple tasks, task relationships, and resource associations.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

The embodiments described herein allow the planning of a project in a semi-automated manner. User data is generated which reflects interactions of a user with a computer user interface when forming task structures in a project plan. Learned behavior data is generated by analyzing the user data for repeated user actions. Formation of a new task structure, started by a user in a project plan, may be automatically completed based on the learned behavior data.

With reference to FIG. 1, in one embodiment, the project planning tool 110 is implemented on the computing device 105 and includes logics for implementing various functional aspects of the project planning tool 110. In one embodiment, the project planning tool 110 includes visual user interface logic 120 (e.g., a visual user interface module), monitoring logic 125 (e.g., a monitoring module), learning logic 130 (e.g., a learning module), matching logic 135 (e.g., a matching module), and auto-completion logic 140 (e.g., an auto-completion module).

The computer system 100 also includes a display screen 150 operably connected to the computing device 105. In accordance with one embodiment, the display screen 150 is implemented to display views of and facilitate user interaction with a graphical user interface (GUI) generated by the visual user interface logic 120 for viewing and updating information associated with a project plan. The graphical user interface may be associated with a project planning application and the visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 150 may represent multiple computing devices/terminals that allow users to access and receive services from the project planning tool 110 via networked computer communications.

In one embodiment, the computer system 100 further includes at least one database device 160 operably connected to the computing device 105 and/or a network interface to access the database device 160 via a network connection. For example, in one embodiment, the database device 160 is operably connected to the visual user interface logic 120. In accordance with one embodiment, the database device 160 is configured to store and manage data structures (e.g., records of current and historical learned behavior data) associated with the project planning tool 110 in a database system (e.g., a computerized project management application).

Other embodiments may provide different logics or combinations of logics that provide the same or similar functionality as the project planning tool 110 of FIG. 1. In one embodiment, the project planning tool 110 is an executable application including algorithms and/or program modules configured to perform the functions of the logics. The application is stored in a non-transitory computer storage medium. That is, in one embodiment, the logics of the project planning tool 110 are implemented as modules of computer-executable instructions stored on a computer-readable medium.

Referring back to the logics of the project planning tool 110 of FIG. 1, in one embodiment, the visual user interface logic 120 is configured to generate a graphical user interface (GUI) to facilitate user interaction with the project planning tool 110. For example, the visual user interface logic 120 includes program code that generates and causes the graphical user interface to be displayed based on an implemented graphical design of the interface. In response to user actions and selections via the GUI, associated aspects of generating and editing task structures in an electronic project plan may be manipulated. Other computer user interfaces, in addition to a graphical user interface, may be provided as well. For example, other computer user interfaces may include a computer keyboard and a computer mouse. In general, in accordance with one embodiment, a computer user interface is configured to facilitate at least the editing of an electronic project plan by a user.

In one embodiment, the visual user interface logic 120 is configured to receive inputs and read data in response to user actions. For example, the visual user interface logic 120 provides functions for selecting, reading, inputting, and storing of learned behavior data associated with learned interactions of one or more users with a computer user interface when creating one or more project plans. The learned behavior data may be read into one of the learning logic 130 or the matching logic 135 from at least one data structure (e.g., from database device 160) associated with (and accessible by) a project planning application (e.g., the project planning tool 110) via the graphical user interface. The completion of the formation of a task structure may be based on the learned behavior data.

Learned behavior data may include, for example, data representing a collection of one or more reusable patterns. A reusable pattern is data associated with and derived from a sequence of user interactions, with at least one computer user interface, that have been learned and recorded by a computerized project planning tool based on repeated use of the sequence of user interactions in task structure creation.

Learned behavior data may be historical, current, or a combination of historical and current. For example, learned behavior data is historical when based on an analysis of historical user data associated with the forming of historical task structures in one or more historical project plans. Learned behavior data is current when based on an analysis of current user data associated with the forming of current task structures in a current project plan. Learned behavior data is a combination of historical and current when historical behavior data is updated based on an analysis of current user data.

Furthermore, the visual user interface logic 120 is configured to facilitate the outputting and displaying of a project plan, via the graphical user interface, on the display screen 150. A project plan may include, for example, a plurality of task structures. Each task structure includes a plurality of tasks in a computerized project plan that defines a block of work. The tasks may be related to each other in time and may be associated with various resources needed to complete the tasks.

In one embodiment, monitoring logic 125 is configured to generate user data by monitoring interactions of a user with at least one computer user interface (e.g., a graphical user interface interacted with via a computer mouse and/or computer keyboard) when forming task structures in a computerized project plan. For example, in one embodiment, the monitoring logic 125 is configured to generate current user data by monitoring interactions of a user with a computer user interface when forming a current task structure in a project plan.

The monitoring logic 125 may generate the user data by recording data associated with, for example, the generation of task structures via key strokes and mouse clicks when editing a project plan on a computer device. For example, when forming a particular task structure in a project plan, a user may perform a sequence of interactions with the graphical user interface to generate a sequence of particular tasks. The data associated with the sequence of interactions is recorded and is associated with the formation of that particular task structure. When forming a different but similar task structure in the project plan, the user may perform the same (or nearly the same) sequence of interactions (i.e., repeated user actions or behavior).

In one embodiment, learning logic 130 is configured to generate learned behavior data by analyzing the user data, generated by the monitoring logic 125, for repeated user actions. For example, the learning logic 130 may be configured to generate learned behavior data having reusable patterns by analyzing at least information associated with user creation of previous task structures for repeated user actions. The learning logic 130 may determine that the user formed several task structures in the project plan by repeating the same (or nearly the same) sequence of interactions with a computer user interface resulting in the same (or nearly the same) task patterns. Because of the repetitive similarity, the learning logic 130 decides to remember that sequence of interactions and the associated task pattern as a learned and reusable pattern (i.e., as learned behavior data).

In accordance with one embodiment, the learning logic 130 is configured as an intelligent agent. In artificial intelligence, an intelligent agent is an autonomous entity, usually implemented as computer programmed instructions, which observes and acts upon an environment and directs its activity towards achieving goals. For example, the learning logic 130 may be configured as an intelligent agent that observes and acts upon user data. The learning logic 130 directs its activity towards determining and remembering the user data directed to repeated user actions and the associated results as reusable patterns, in accordance with one embodiment.

The learning logic 130 may also be configured to update learned behavior data based at least in part on analyzing recent user data for repeated user actions. For example, the learning logic 130 may be configured to generate learned behavior data by updating historical behavior data based on analyzing current user data for repeated user actions, in accordance with one embodiment. The historical behavior data may be based on an analysis of historical user data for repeated user actions and may be associated with the forming of historical task structures in one or more historical project plans.

In one embodiment, matching logic 135 is configured to compare user data, associated with the partial forming of a task structure, to learned behavior data. The matching logic 135 determines if the user data matches a reusable pattern of the learned behavior data as part of the comparing. For example, matching logic 135 may be configured to compare current user data, monitored in a current project plan, to learned behavior data to determine if the current user data matches a reusable pattern of the learned behavior data. Also, in one embodiment, the auto-completion logic 140 is configured to automatically complete the forming of a task structure in a project plan based on a matching reusable pattern.

For example, when a user begins creating a new task structure in a project plan, the matching logic 135 may determine that the corresponding user data correlates well to a first part of a reusable pattern of the learned behavior data. In this manner, the reusable pattern may be identified as a candidate for completing the formation of the new task structure. Subsequently, the auto-completion logic 140 may automatically complete the new task structure in the project plan using the matching reusable pattern of the learned behavior data. User permission to perform the automatic completion of the new task structure may or may not be solicited by the project planning tool 110, in accordance with various embodiments.

In this manner, as a user generates task structures in a project plan, the project planning tool 110 will "learn" the repeated behaviors of the user. The project planning tool 110 will then use the learned behaviors to aid the user in completing subsequent task structures in the project plan that are being created in what appears to be the same, or at least a very similar, manner as previous task structures.

FIGS. 2-6 illustrate embodiments of various methods 200-600. The methods 200-600 describe operations of the project planning tool 110 and are implemented to be performed by the project planning tool 110 of FIG. 1, or by a computing device configured with algorithms of the methods 200-600. For example, in one embodiment, methods 200-600 are implemented by a computing device configured to execute a computer application. The computer application is configured to process data in electronic form and includes stored executable instructions that perform the functions of the methods 200-600.

The methods 200-600 will be described from the perspective that an electronic or computerized project plan is made up of a plurality of task structures. A task structure may include a plurality of tasks that define a block of work. The tasks may be related to each other in time and may be associated with various resources needed to complete the tasks. Task structures may be created within the project plan by a user (e.g., a project manager) interacting with one or more computer user interfaces. However, some task structures may pre-exist in the project plan (e.g., in a stored project template) and may be modified or edited by the user interacting with one or more computer user interfaces.

Figure 2:
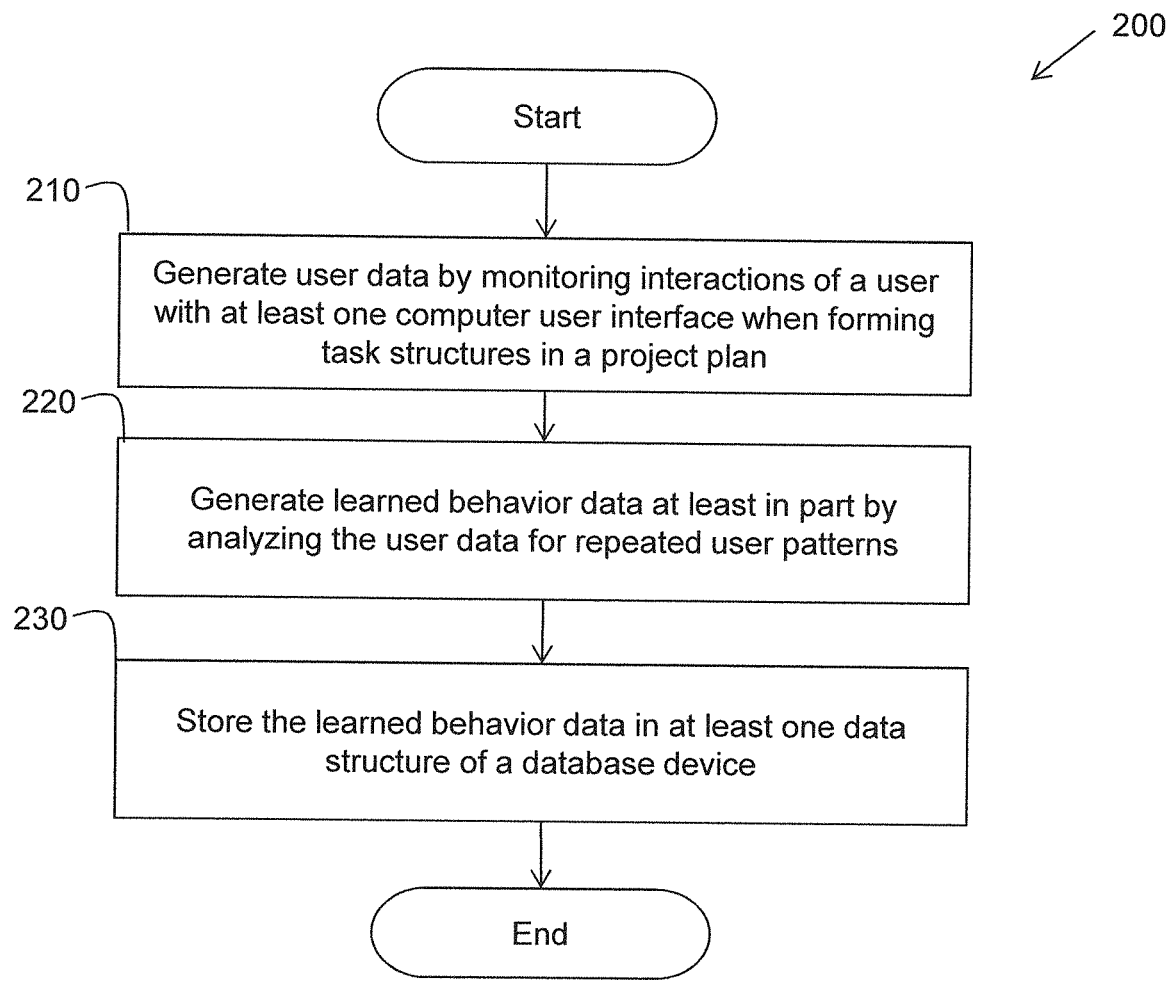
FIG. 2 illustrates one embodiment of a method, which can be performed by the project planning tool of the computer system of FIG. 1, for automatically learning the behavior of a user when generating task structures in a project plan.

FIG. 2 illustrates one embodiment of a method 200, which can be performed by the project planning tool 110 of the computer system 100 of FIG. 1, for automatically learning the behavior of a user when generating task structures in a project plan. Upon initiating method 200, at block 210, the tool 110 monitors a user that is interacting with at least one computer user interface. The user's interactions involve forming task structures in a project plan. The interactions are monitored and at least input and output data from the interactions are collected via the user interface and stored in a data structure. User data is then generated from the collected data where the user data reflects the interactions performed to create the task structures. For example, a user may open a new project plan file using the project planning tool 110 of the computer system 100 and interact with a graphical user interface using, for example, a computer mouse to form task structures in a project plan. Thus, the user data is generated by monitoring interactions of the user with the computer user interface while the user forms task structures in the project plan. In accordance with one embodiment, block 210 is performed by monitoring logic 125 of the project planning tool 110.

At block 220, learned behavior data is generated by analyzing the user data for repeated user patterns. For example, a user may generate two or more task structures in the project plan that are the same or very similar to each other. When generating the same or similar task structures, the user repeats certain actions from one task structure to the next. In accordance with one embodiment, the monitoring logic 125 generates the user data, having the repeated user actions, and the learning logic 130 finds and learns (remembers) the repeated user actions in the user data as learned behavior data (reusable patterns). At block 230, the learned behavior data is stored in a data structure of, for example, the database device 160.

In this manner, the project planning tool 110 can learn repeated behaviors of a user and leverage the learned behavior to aid the user in efficiently completing task structures in a project plan, as discussed in more detail later herein.

Figure 3:
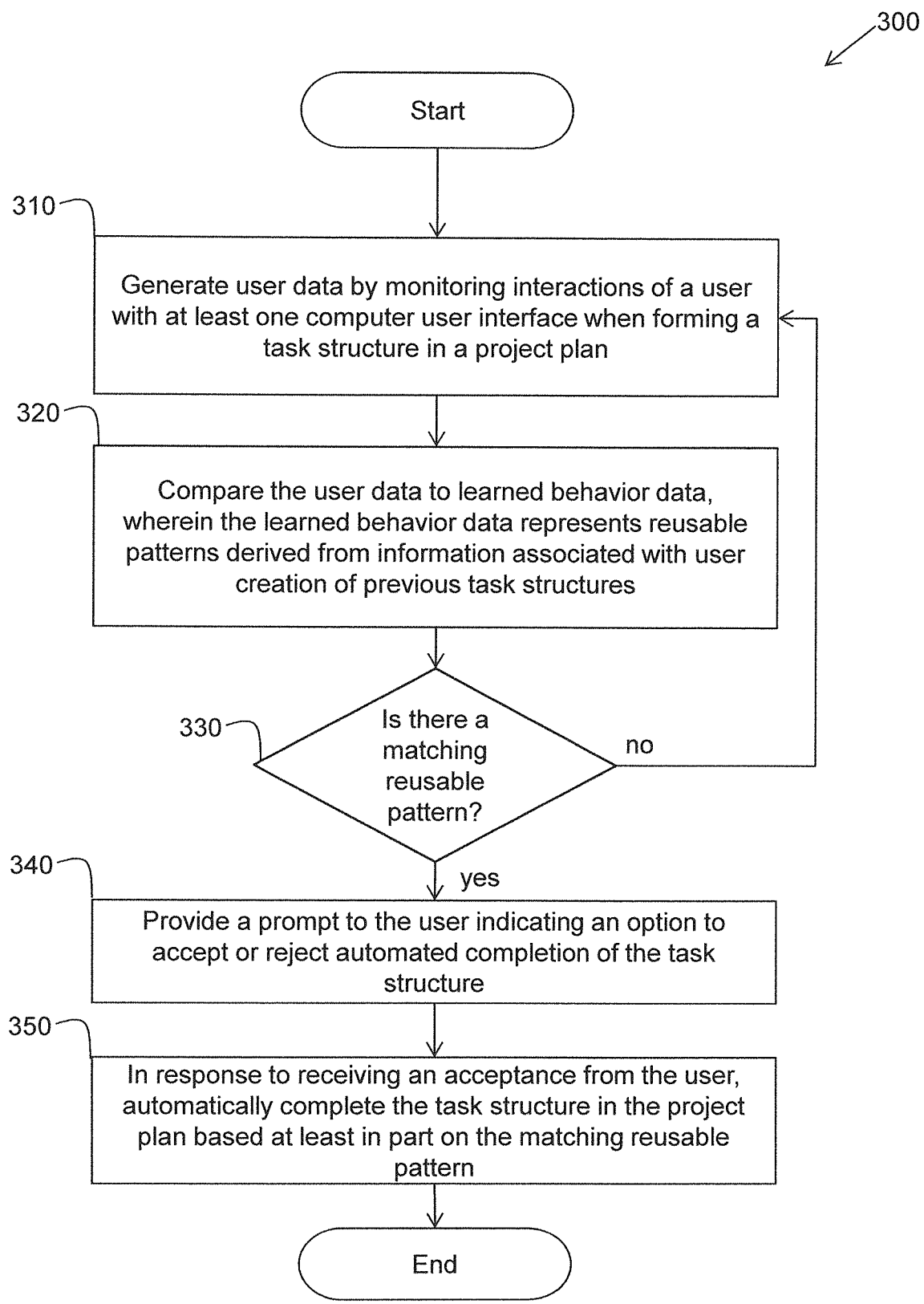
FIG. 3 illustrates one embodiment of a method, which can be performed by the project planning tool of the computer system of FIG. 1, for automatically transforming an incomplete task structure to a complete task structure in a project plan.

FIG. 3 illustrates one embodiment of a method 300, which can be performed by the project planning tool 110 of the computer system 100 of FIG. 1, for automatically transforming an incomplete task structure to a complete task structure in a project plan. Upon initiating method 300, at block 310, the tool monitors a user that is interacting with at least one computer user interface. The user's interactions involve forming task structures in a project plan. The interactions are monitored and at least input and output data from the interactions are collected via the user interface and stored in a data structure. User data is then generated from the collected data where the user data reflects the interactions performed to create the task structures. Thus, the user data is generated by monitoring interactions of the user with the computer user interface while the user forms task structures in the project plan. In accordance with one embodiment, block 310 is performed by monitoring logic 125 of the project planning tool 110.

At block 320, the user data is compared to learned behavior data. The learned behavior data is the data previously generated as described with reference to FIG. 2. The learned behavior data represents reusable patterns derived from information associated with user creation of previous task structures (e.g., previous task structures in the current project plan and/or previous project plans). In accordance with one embodiment, block 320 is performed by matching logic 135 of the project planning tool 110.

At block 330, a determination is made, based on the comparing operation at block 320, as to whether the user data matches (e.g., highly correlates to) a reusable pattern in the learned behavior data. For example, the user data may include data associated with the formation of tasks A and B within a current task structure, in that order. The comparing operation searches a database of stored reusable patterns (from the learned behavior data) and attempts to identify a match with the user's current pattern of "A, B." A matching pattern may include a reusable pattern of tasks A, B, C, D, E, and F in that order, since the pattern matches "A, B." In accordance with one embodiment, block 330 is performed by matching logic 135 of the project planning tool 110.

At block 340, if the user data matches a reusable pattern of the learned behavior data, a prompt is provided to (e.g., displayed to) the user indicating an option to accept or reject automated completion of the task structure. The user may accept or reject the option of automated completion (e.g., via a computer user interface). In accordance with one embodiment, block 340 is performed by the matching logic 135 in cooperation with the visual user interface logic 120.

At block 350, in response to receiving an acceptance from the user, the forming of the task structure is automatically completed in the project plan based at least in part on the matching reusable pattern. For example, the incomplete task structure is populated with the tasks that are defined in the matching reusable pattern. In accordance with one embodiment, block 350 is performed by auto-completion logic 140 of the project planning tool 110.

In this manner, as a user begins to form a task structure in a project plan, the project planning tool 110 can determine that the user seems to be forming a task structure that is the same as (or at least very similar to) a previous task structure that was formed (either in the current project plan or a previous project plan). As a result, the user can choose to have the task structure automatically completed by the project planning tool 110, if desired. In accordance with an alternative embodiment, the project planning tool 110 can be placed in a mode of operation where the automatic completion of a task structure in a project plan may occur without prior approval from the user.

Figure 4:
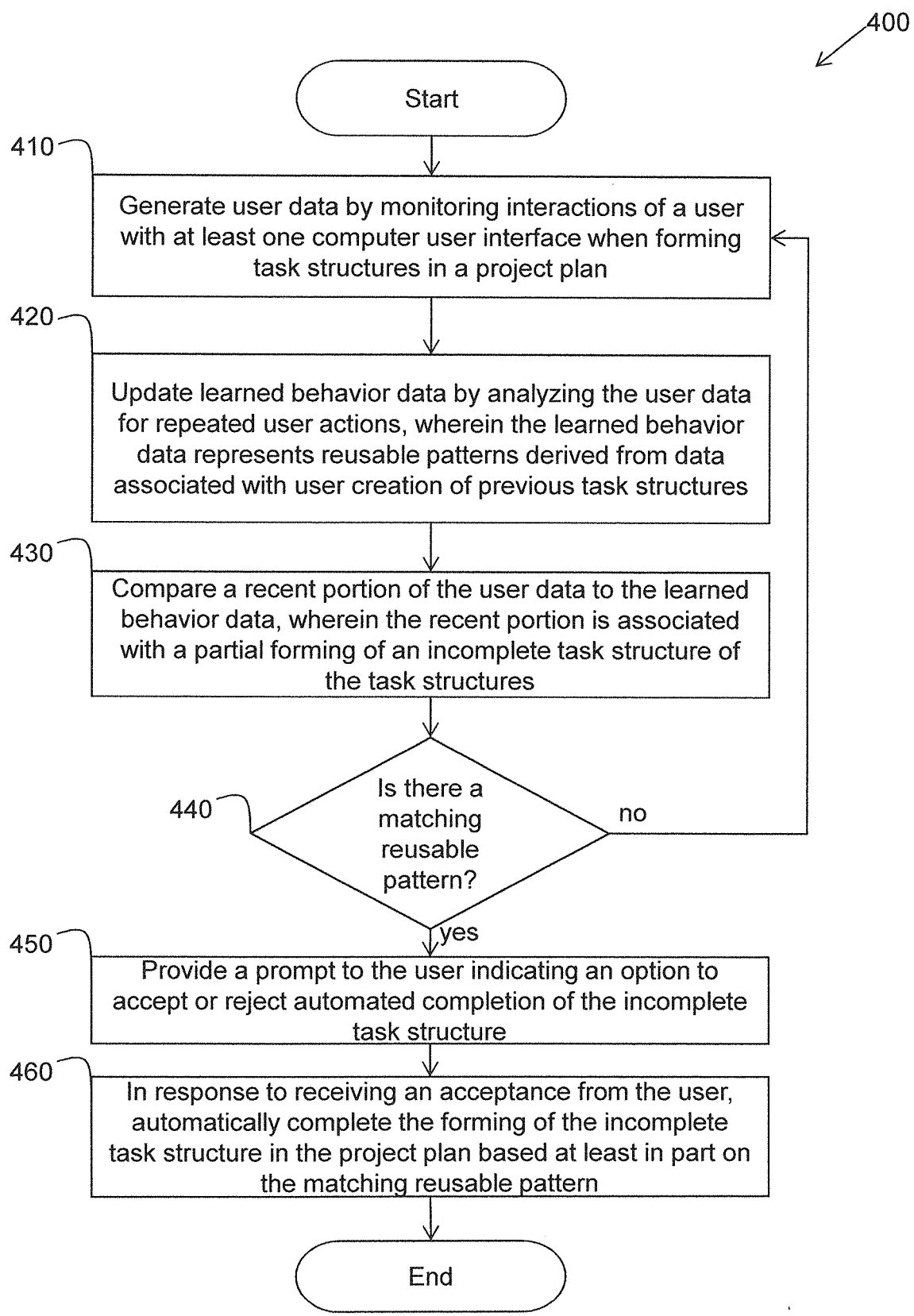
FIG. 4 illustrates another embodiment of a method, which can be performed by the project planning tool of the computer system of FIG. 1, for automatically transforming an incomplete task structure to a complete task structure in a project plan.

FIG. 4 illustrates another embodiment of a method 400, which can be performed by the project planning tool 110 of the computer system 100 of FIG. 1, for automatically transforming an incomplete task structure to a complete task structure in a project plan. Upon initiating method 400, at block 410, the tool 110 monitors a user that is interacting with at least one computer user interface. The user's interactions involve forming task structures in a project plan. The interactions are monitored and at least input and output data from the interactions are collected via the user interface and stored in a data structure. User data is then generated from the collected data where the user data reflects the interactions performed to create the task structure. Thus, the user data is generated by monitoring interactions of the user with the computer user interface while the user forms the task structures in the project plan. In accordance with one embodiment, block 410 is performed by monitoring logic 125 of the project planning tool 110.

At block 420, learned behavior data is updated by analyzing the user data for repeated user actions. The learned behavior data, before updating, represents reusable patterns derived from data associated with user creation of previous task structures. The previous task structures may be from one or more historical project plans, for example. In accordance with one embodiment, block 420 is performed by learning logic 130 of the project planning tool 110.

At block 430, a recent portion of the user data is compared to the learned behavior data. The recent portion of the user data is associated with the partial forming of an incomplete task structure (e.g., a most-recent task structure) in the current project plan. In accordance with one embodiment, block 430 is performed by matching logic 135 of the project planning tool 110. At block 440, a determination is made, based on the comparing operation at block 430, as to whether the recent portion of the user data matches (e.g., correlates to, matches a threshold portion/amount) a reusable pattern in the learned behavior data. In accordance with one embodiment, block 440 is performed by matching logic 135 of the project planning tool 110.

At block 450, if the recent portion of the user data matches a reusable pattern of the learned behavior data, a prompt is provided to (e.g., displayed to) the user indicating an option to accept or reject automated completion of the incomplete task structure. The user may accept or reject the option in the prompt (e.g., via a computer user interface). In accordance with one embodiment, block 450 is performed by the matching logic 135 in cooperation with the visual user interface logic 120.

At block 460, in response to receiving an acceptance from the user, the forming of the incomplete task structure is automatically completed in the project plan based at least in part on the matching reusable pattern. For example, the incomplete task structure is populated with the tasks that are defined in the matching reusable pattern. In accordance with one embodiment, block 460 is performed by auto-completion logic 140 of the project planning tool 110.

In this manner, as a user forms task structures in a current project plan, learned behavior data may be updated in real time to reflect repeated user actions performed while forming the task structures. As a user begins to form a most-recent task structure in the project plan, the project planning tool 110 can determine that the user seems to be forming a task structure that is the same as (or at least very similar to) a previous task structure that was formed (either in the current project plan or a previous project plan). As a result, the user can choose to have the most-recent task structure automatically completed by the project planning tool 110, if desired. In accordance with an alternative embodiment, the project planning tool 110 can be placed in a mode of operation where the automatic completion of a task structure in a project plan may occur without prior approval from the user.

Figure 5:
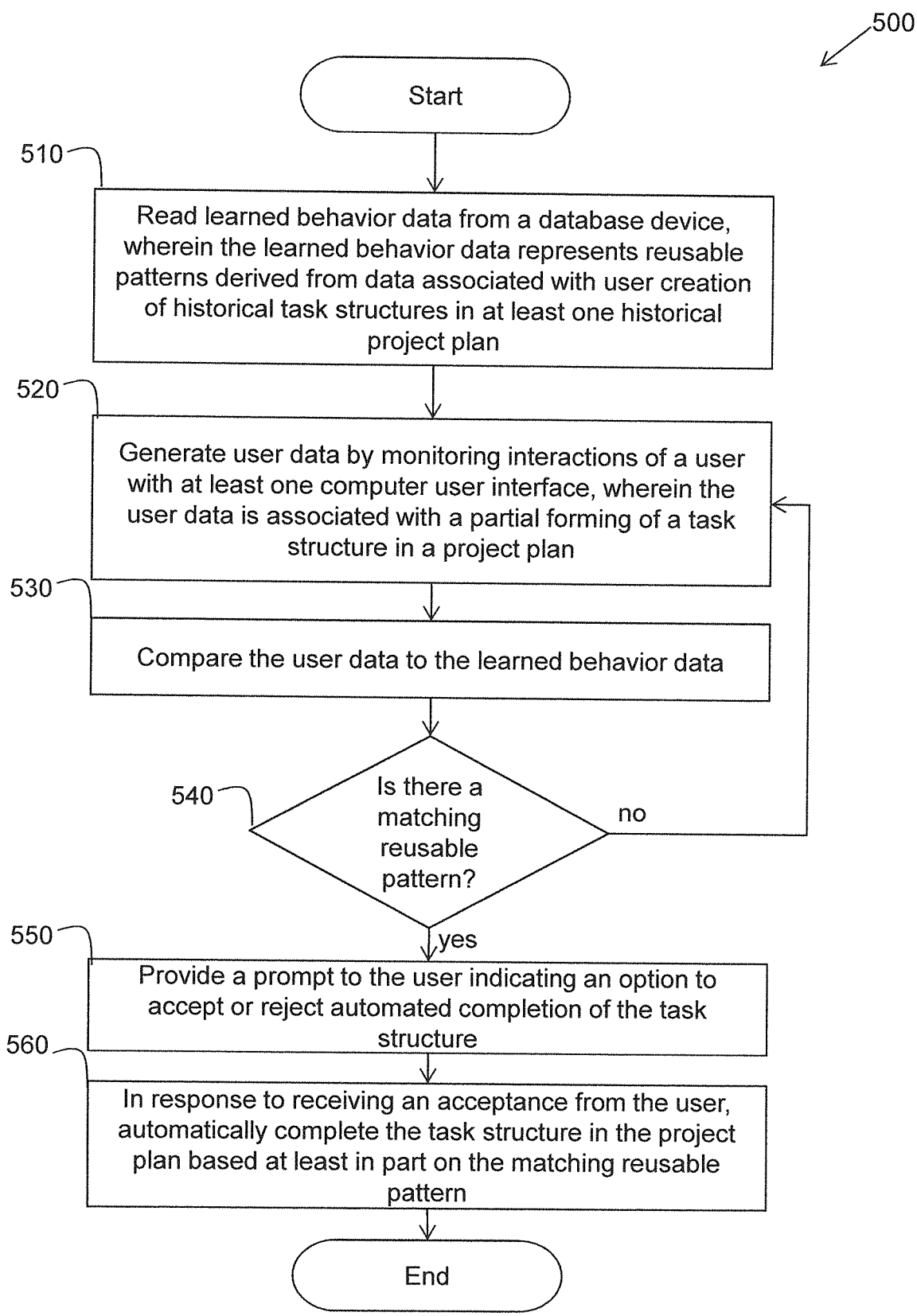
FIG. 5 illustrates yet another embodiment of a method, which can be performed by the project planning tool of the computer system of FIG. 1, for automatically transforming an incomplete task structure to a complete task structure in a project plan.

FIG. 5 illustrates yet another embodiment of a method 500, which can be performed by the project planning tool 110 of the computer system 100 of FIG. 1, for automatically transforming an incomplete task structure to a complete task structure in a project plan. Upon initiating method 500, at block 510, learned behavior data is read from a database device. The learned behavior data represents reusable patterns derived from data associated with user creation of historical task structures in at least one historical project plan. In accordance with one embodiment, reading of the learned behavior data is performed by visual user interface logic 120 of the project planning tool 110 in response to user interaction with a graphical user interface provided by visual user interface logic 120.

At block 520, the tool 110 monitors a user that is interacting with at least one computer user interface. The user's interactions involve the partial forming of a task structure in a project plan. The interactions are monitored and at least input and output data from the interactions are collected via the user interface and stored in a data structure. User data is then generated from the collected data where the user data reflects the interactions performed to partially create the task structure. Thus, the user data is generated by monitoring interactions of the user with the computer user interface while the user partially forms a task structure in the project plan. In accordance with one embodiment, block 520 is performed by monitoring logic 125 of the project planning tool 110. At block 530, the user data is compared to the learned behavior data. In accordance with one embodiment, block 530 is performed by the matching logic 135 of the project planning tool 110.

At block 540, a determination is made, based on the comparing operation at block 530, as to whether the user data matches (e.g., highly correlates to) a reusable pattern in the learned behavior data. In accordance with one embodiment, block 540 is performed by matching logic 135 of the project planning tool 110. At block 550, if the user data matches a reusable pattern of the learned behavior data, a prompt is provided to (e.g., displayed to) the user indicating an option to accept or reject automated completion of the task structure. The user may accept or reject the option in the prompt (e.g., via a computer user interface). In accordance with one embodiment, block 550 is performed by the matching logic 135 in cooperation with the visual user interface logic 120.

At block 560, in response to receiving an acceptance from the user, the forming of the task structure is automatically completed in the project plan based at least in part on the matching reusable pattern. For example, the incomplete task structure is populated with the tasks that are defined in the matching reusable pattern. In accordance with one embodiment, block 560 is performed by auto-completion logic 140 of the project planning tool 110.

In this manner, as a user partially forms (but has not completed forming) a task structure in the project plan, the project planning tool 110 can determine that the user seems to be forming a task structure that is the same as (or at least very similar to) a previous task structure that was formed (either in the current project plan or a previous project plan) in accordance with a reusable pattern of the learned behavior data. As a result, the user can choose to have the partially formed task structure automatically completed (fully formed) by the project planning tool 110, if desired. In accordance with an alternative embodiment, the project planning tool 110 can be placed in a mode of operation where the automatic completion of a task structure in a project plan may occur without prior approval from the user.

Figure 6:
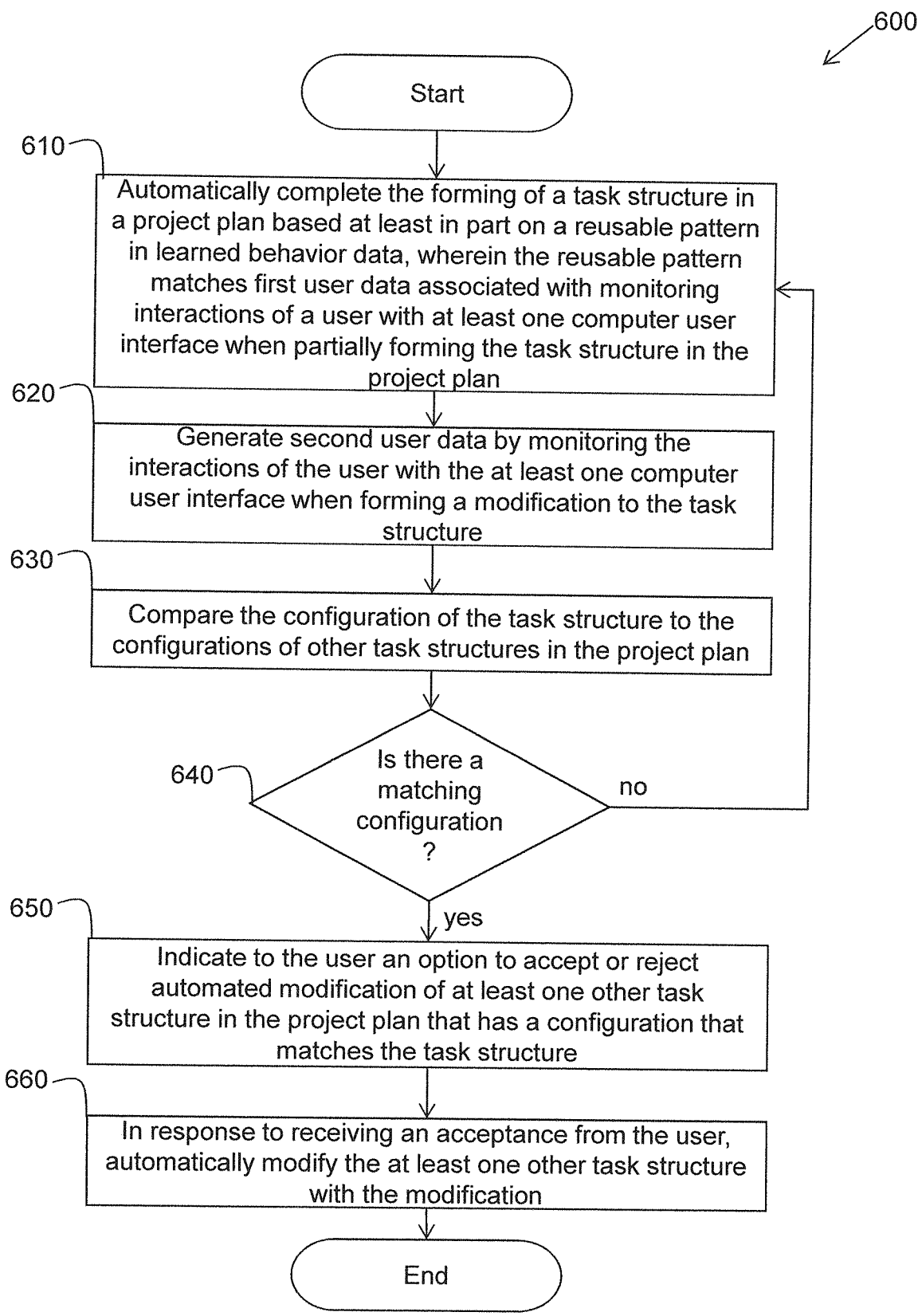
FIG. 6 illustrates one embodiment of a method, which can be performed by the project planning tool of the computer system of FIG. 1, for automatically modifying task structures in a project plan.

FIG. 6 illustrates one embodiment of a method 600, which can be performed by the project planning tool 110 of the computer system 100 of FIG. 1, for automatically modifying task structures in a project plan. Upon initiating method 600, at block 610, the forming of a task structure is automatically completed in a project plan based at least in part on a reusable pattern in learned behavior data. The reusable pattern matches first user data associated with monitoring interactions of a user with at least one computer user interface when partially forming the task structure in the project plan. In accordance with one embodiment, block 610 is performed by auto-completion logic 140 of the project planning tool 110.

At block 620, second user data is generated by monitoring the interactions of the user with at least one computer user interface when forming a modification to the task structure. For example, the user may decide to substitute one task within the task structure with another task to form the modification. As another example, the user may decide to assign different resources to one task within the task structure to form the modification. Other modifications are possible as well. In accordance with one embodiment, block 620 is performed by monitoring logic 125 of the project planning tool 110.

At block 630, a configuration of the task structure is compared to the configurations of other task structures in the project plan. In accordance with one embodiment, block 630 is performed by matching logic 135 of the project planning tool 110. At block 640, a determination is made, based on the comparing operation at block 630, as to whether the configuration of the task structure matches (e.g., highly correlates to) a configuration of one or more other task structures in the project plan. In accordance with one embodiment, block 640 is performed by matching logic 135 of the project planning tool 110.

At block 650, if the configuration of the task structure matches (e.g., highly correlates to) a configuration of one or more other task structures in the project plan, a prompt is provided to (e.g., displayed to) the user indicating an option to accept or reject automated modification of the one or more other task structures. The user may accept or reject the option in the prompt (e.g., via a computer user interface). In accordance with one embodiment, block 650 is performed by the matching logic 135 in cooperation with the visual user interface logic 120. At block 660, in response to receiving an acceptance from the user, the modification of the one or more matching task structures is automatically completed in the project plan. In accordance with one embodiment, block 660 is performed by auto-completion logic 140 of the project planning tool 110. Furthermore, in accordance with one embodiment, learning behavior data may be updated based on an analysis of the second user data (generated by monitoring the interactions of the user with at least one computer user interface when forming a modification to the task structure) for repeated user actions.

In this manner, not only can task structures be automatically completed in a project plan, task structures that are completed can be automatically modified in a project plan. As a result, a user can choose to have task structures with matching configurations modified by the project planning tool 110, if desired. In accordance with an alternative embodiment, the project planning tool 110 can be placed in a mode of operation where the automatic modification of a task structure in a project plan may occur without prior approval from the user.

Figure 7A:
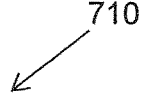
FIG. 7A illustrates a first embodiment of a task structure formed by the system of FIG. 1 using one of the methods of FIG. 3, 4, or 5.

FIG. 7A illustrates a first embodiment of a task structure 710 formed by the system 100 of FIG. 1 using one of the methods of FIG. 3, 4, or 5. In FIG. 7A, a user has created a summary task structure with two (2) distinct tasks (development and testing). Each task has a relationship with the other task. The first task is always a development task. The next time a user starts to create a summary task structure and, for example, starts typing "development" within the summary task structure, the system may prompt the user to automatically complete the summary task structure with tasks, relationships, and assignments based on reusable patterns in learned behavior data captured by the system 100.

Figure 7B:
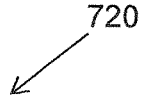
FIG. 7B illustrates a second embodiment of a task structure formed by the system of FIG. 1 using one of the methods of FIG. 3, 4, or 5.

FIG. 7B illustrates a second embodiment of a task structure 720 formed by the system 100 of FIG. 1 using one of the methods of FIG. 3, 4, or 5. In the summary task structure 720 of FIG. 7B, the first task is Ux Design and the system knows that the user always creates three (3) additional tasks (development, testing, and performance testing) in such a task structure. This pattern has been captured (learned) from across project plans and may be applied to automatically complete similar task structures in a current project plan.

In this manner, completion of task structures and modifications to task structures may be automatically performed by a project planning tool, providing more efficient creation of project plans.

Systems, methods, and other embodiments have been described that are configured to automatically complete a task structure in a project plan based on learned user behavior. In one embodiment, at least one computer user interface is configured to facilitate the editing of an electronic project plan. Monitoring logic is configured to generate user data by monitoring interactions of the user with the computer user interface when forming a task structure in the project plan. Learning logic is configured to generate learned behavior data having reusable patterns by analyzing information associated with user creation of previous task structures for repeated user actions. Matching logic is configured to compare the user data to the learned behavior data to determine if the user data matches a reusable pattern of the learned behavior data. Auto-completion logic is configured to automatically complete the forming of the task structure in the project plan based on the reusable pattern.

COMPUTING DEVICE EMBODIMENT

Figure 8:
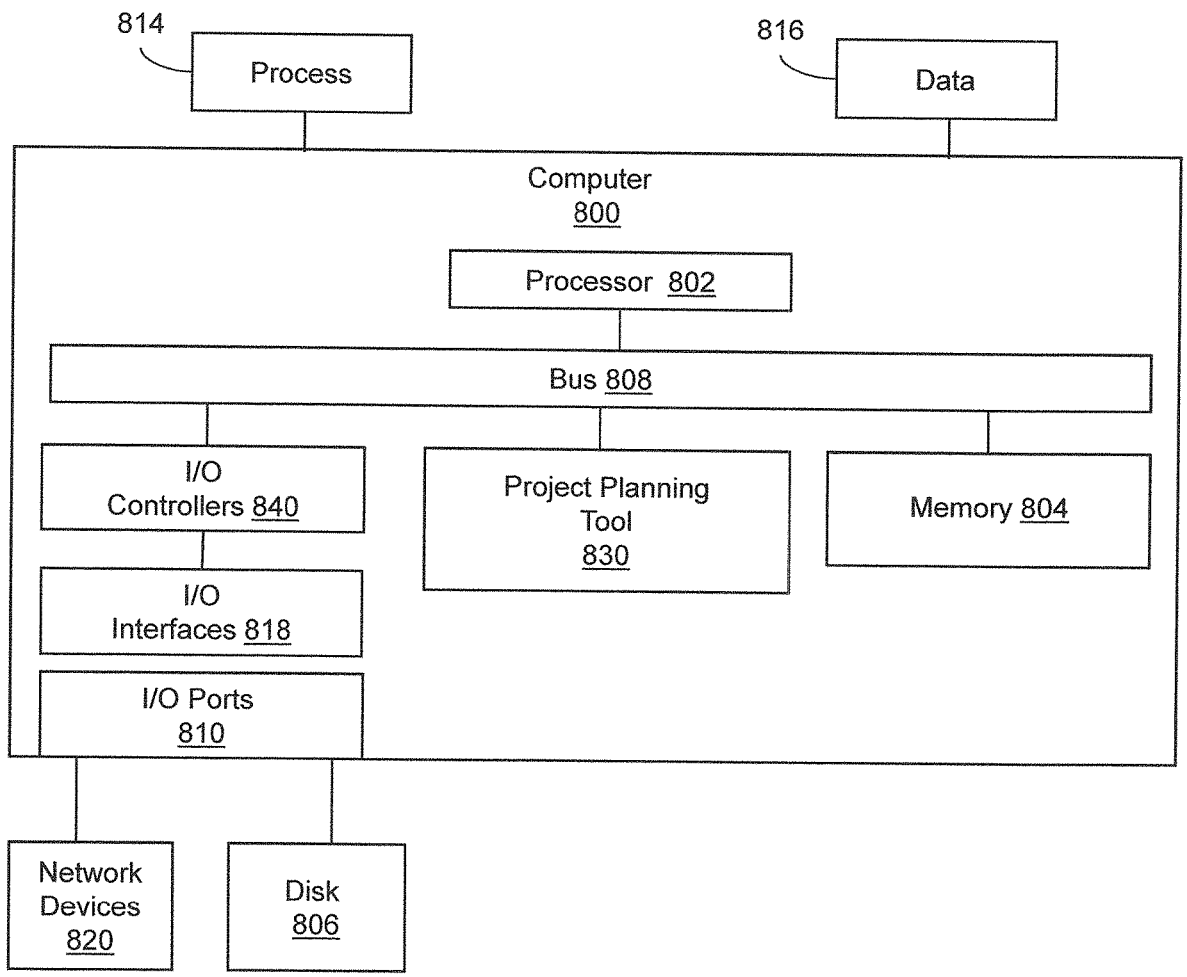
FIG. 8 illustrates one embodiment of a computing device upon which a project planning tool of a computing system may be implemented.

FIG. 8 illustrates an example computing device that is configured and/or programmed with one or more of the example systems and methods described herein, and/or equivalents. FIG. 8 illustrates one example embodiment of a computing device upon which an embodiment of a project planning tool may be implemented. The example computing device may be a computer 800 that includes a processor 802, a memory 804, and input/output ports 810 operably connected by a bus 808.

In one example, the computer 800 may include project planning tool 830 (corresponding to project planning tool 110 from FIG. 1) configured with a programmed algorithm as disclosed herein to automatically complete the forming of task structures based on learned user behavior. In different examples, the tool 830 may be implemented in hardware, a non-transitory computer-readable medium with stored instructions, firmware, and/or combinations thereof. While the tool 830 is illustrated as a hardware component attached to the bus 808, it is to be appreciated that in other embodiments, the tool 830 could be implemented in the processor 802, a module stored in memory 804, or a module stored in disk 806.

In one embodiment, tool 830 or the computer 800 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the auto-completion of task structures for a project plan. The means may also be implemented as stored computer executable instructions that are presented to computer 800 as data 816 that are temporarily stored in memory 804 and then executed by processor 802.

Tool 830 may also provide means (e.g., hardware, non-transitory computer-readable medium that stores executable instructions, firmware) for facilitating the automatic completion of task structures in a project plan.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A storage disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

"Operable interaction" or "operative interaction", and there various forms as used herein, refers to the logical or communicative cooperation between two or more logics via an operable (operative) connection to accomplish a function.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method implemented by a computing device configured to execute a computer application, wherein the computer application is configured to process data in electronic form, the method comprising:

analyzing the information associated with the user creation of previous task structures for repeated user actions to generate learned behavior data, wherein a sequence of interactions and associated task pattern are retained as a reusable pattern of the learned behavior data where the user formed several task structures in a project plan by repeating similar sequences of interactions that result in similar task patterns;

generating first data by recording interactions of a user with at least one computer user interface when the user is forming a task structure in a project plan;

comparing the first data to the learned behavior data stored in a data structure in a database to determine that the first data matches the reusable pattern of the learned behavior data, wherein the first data includes interactions to name a task within the task structure;

where, based on the comparing, the first data matches the reusable pattern of the learned behavior data, displaying a prompt to the user indicating an option to accept or reject automated completion of the task structure; and in response to receiving the option to accept from the user, automatically completing the formation of the task structure in the project plan based at least in part on the reusable pattern by populating the task structure with tasks defined in the reusable pattern.

2. The method of claim 1, further comprising:

reading the learned behavior data from a data structure of historical behavior data;

generating second data by monitoring the interactions of the user with the at least one computer user interface when forming other task structures in the project plan;

analyzing the second data for repeated user actions; and updating the learned behavior data based on the analyzing.

3. The method of claim 1, wherein the monitoring of the interactions of the user with the at least one computer user interface when forming the task structure in the project plan-comprises monitoring the interactions of the user with a graphical user interface when the task structure is formed in the project plan.

4. The method of claim 1, further comprising:

after automatically completing the task structure, generating second data by monitoring the interactions of the user with the at least one computer user interface in response to the user modifying at least the task structure;

analyzing the second data for repeated user actions; and updating the learned behavior data based on the analyzing.

5. The method of claim 4, wherein the monitoring of interactions of the user with the at least one computer user interface when modifying the at least the task structure comprises monitoring the interactions of the user with a graphical user interface in response to the user modifying at least the task structure.

6. The method of claim 1, further comprising:

after automatically completing the task structure, generating second data by monitoring the interactions of the user with the at least one computer user interface when a modification to the task structure is formed;

displaying a second prompt to the user, in response to the second data, indicating an option to accept or reject automated modification for at least one other task structure in the project plan that has a same configuration as the task structure; and in response to receiving a second acceptance from the user, automatically modifying the at least one other task structure with the modification.

7. The method of claim 6, wherein the monitoring of the interactions of the user with the at least one computer user interface when the modification to the task structure is formed comprises monitoring the interactions of the user with a graphical user interface when the modification to the task structure is formed.

8. The method of claim 1, wherein the monitoring further includes monitoring output data of the interactions; and wherein the comparing further includes comparing the output data of the interactions with the learned behavior data.

9. The method of claim 1, wherein the comparing further includes determining that the first data matches the reusable pattern of the learned behavior data when the first data forms an associated task structure in the same order as in the reusable pattern.

10. The method of claim 1, wherein the comparing further includes determining that first data matches the pattern when the sequence of tasks formed by the first data matches at least a threshold portion of the reusable pattern.

11. A computing system, comprising:

at least one processor;

at least one computer user interface configured to facilitate at least editing of an electronic project plan by a user;

a monitoring module, including instructions stored in a non-transitory computer-readable medium, that when executed by the at least one processor is configured to generate user data by recording interactions of the user with the at least one computer user interface when the user is forming a task structure in the project plan;

a learning module, including instructions stored in the non-transitory computer-readable medium, that when executed by the at least one processor is configured to generate learned behavior data having reusable patterns by analyzing at least information associated with user creation of previous task structures for repeated user actions in the monitored interactions of the user with the at least one computer user interface, wherein a sequence of interactions and associated task pattern are retained as a reusable pattern of the learned behavior data where the user formed several task structures in the project plan by repeating similar sequences of interactions that result in similar task patterns;

a matching module, including instructions stored in the non-transitory computer-readable medium, that when executed by the at least one processor is configured to compare the user data to the learned behavior data stored in a data structure in a database to determine that the user data matches the reusable pattern of the learned behavior data, wherein the user data includes interactions to name a task within the task structure; and an auto-completion module, including instructions stored in the non-transitory computer-readable medium, that when executed by the at least one processor is configured to automatically complete the formation of the task structure in the project plan based at least in part on the reusable pattern by populating the task structure with tasks defined in the reusable pattern.

12. The computing system of claim 11, wherein the learning module is further configured to update the learned behavior data based at least in part on analyzing the user data for other previously repeated user actions.

13. The computing system of claim 11, wherein the task structure includes a plurality of tasks in a project plan that define a block of work, and wherein the tasks in the task structure are related to each other in time.

14. The computing system of claim 11, further comprising a visual user interface module, including instructions stored in the non-transitory computer-readable medium, that when executed by the at least one processor is configured to: provide a graphical user interface of the at least one computer user interface; facilitate reading of the learned behavior data from the database device into at least one of the learning module or the matching module via the graphical user interface; and facilitate at least the editing of the electronic project plan by the user.

15. A non-transitory computer-readable medium storing computer-executable instructions that are part of an algorithm that, when executed by a computer, cause the computer to perform functions, wherein the instructions comprise:

instructions for analyzing the information associated with user creation of previous task structures for repeated user actions to generate learned behavior data, wherein a sequence of interaction and associated task pattern are retained as a reusable pattern of the learned behavior data where the user formed several task structures in a project plan by repeating similar sequences of interactions that result in similar task patterns;

instructions for generating first data by recording interactions of a user with at least one computer user interface when the user is forming a task structure in a project plan;

instructions for comparing the first data to the learned behavior data stored in a data structure in a database to determine that the first data matches the reusable pattern of the learned behavior data, wherein the first data includes interactions to name a task within the task structure; and instructions for where, based on the comparing, the first data matches the reusable pattern of the learned behavior data, automatically completing the formation of the task structure in the project plan based at least in part on the reusable pattern by populating the task structure with tasks defined in the reusable pattern.

16. The non-transitory computer-readable medium of claim 15, wherein the instructions further include instructions configured for:

reading the learned behavior data from a data structure of historical behavior data;

generating second data by monitoring the interactions of the user with the at least one computer user interface when forming other task structures in the project plan;

analyzing the second data for repeated user actions; and updating the learned behavior data based on the analyzing.

17. The non-transitory computer-readable medium of claim 15, wherein the instructions further include instructions configured for:

after automatically completing the forming of the task structure, generating second data by monitoring the interactions of the user with the at least one computer user interface when at least the task structure is being modified;

analyzing the second data for repeated user actions; and updating the learned behavior data based on the analyzing.

18. The non-transitory computer-readable medium of claim 15, wherein the instructions further include instructions configured for:

after automatically completing the task structure, generating second data by monitoring the interactions of the user with the at least one computer user interface when a modification to the task structure is formed; and automatically modifying at least one other task structure in the project plan, that has a same configuration as the task structure, with the modification.

19. The non-transitory computer-readable medium of claim 15, wherein the user actions are interactions of the user with the at least one computer user interface.

20. The computing system of claim 15, wherein the tasks with which the task structure is populated are those that are always created in task structures by the user following entry of the first data.

\* \* \* \* \*

UNITED STATES PATENT AND TRADEMARK OFFICE
CERTIFICATE OF CORRECTION

PATENT NO. : 10,902,339 B2
APPLICATION NO. : 14/721114
DATED : January 26, 2021
INVENTOR(S) : Kumar et al.

Page 1 of 1

It is certified that error appears in the above-identified patent and that said Letters Patent is hereby corrected as shown below:

On the Title Page

Item (56), Column 2, under Other Publications, Line 3, delete "Internatinal" and insert -- International --, therefor.

In the Claims

In Column 19, Line 20, in Claim 20, delete "claim 15" and insert -- claim 11 --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*